UNITED STATES PATENT OFFICE.

LANDON J. LOCKETT, OF BRENHAM, TEXAS.

METHOD AND COMPOSITION FOR RECLAIMING GUMMER AND LINTER FILES.

1,372,303.   Specification of Letters Patent.   Patented Mar. 22, 1921.

No Drawing.   Application filed June 17, 1920. Serial No. 389,792.

*To all whom it may concern:*

Be it known that I, LANDON J. LOCKETT, a citizen of the United States, and a resident of Brenham, county of Washington and State of Texas, have made an Invention Appertaining to Methods and Compositions for Reclaiming Gummer and Linter Files; and I do hereby declare the following to be a full, clear, and exact description of the invention, such as will enable others skilled in the art to which it appertains to make and use the same.

My invention has for its object to reclaim the files used in sharpening linter saws that are utilized in cutting the lint from cotton seed after the long fiber has been removed from the seed. In this operation the saws become gummed with the cotton seed oil that exudes from the cotton seed. When the saws become dull it is necessary to file the saws to sharpen them and the gum that collects on the saws quickly gums the files and inasmuch as this gum and the filings harden in the file, the files soon become useless and are soon discarded. In reclaiming the files, the files ordinarily are recut, which is a costly proceeding and makes the reclaimed files quite as expensive as the original cost of the files.

By my invention I have provided a composition and a process whereby the gummer and linter files for sharpening linter saws may be readily reclaimed at a very low cost, thus saving the cost of reformation of the files.

In reclaiming the gummer and linter files in accordance with my invention, the files are boiled a short time in a solution of saleratus in water. I find it preferable to boil the files at the first reclaiming about one-half hour in a solution of about four ounces of saleratus in about one quart of water until the files are cleaned. During subsequent reclaimings of the files I find it desirable to increase the length of time of boiling the files to one hour or more, according to the number of preceding reclaimings that have been performed upon the files.

The files are then immersed in a solution of ammonium sulfate in water acidified with sulfuric acid. I find it preferable to immerse the files about four hours, in the first reclaiming of the files, in a solution of about one-tenth of an ounce of granulated ammonium sulfate to about one quart of rain or distilled water, to which is added about four ounces of the best commercial grade of sulfuric acid. During the second reclaiming the files are immersed in the solution about six hours and, during the third reclaiming, the files are immersed about eight hours. In each reclaiming the strength of the solution should be increased by ten per cent., that is, for each reclaiming the amount of the granulated ammonium sulfate and the amount of the sulfuric acid should be increased by ten per cent.

At the termination of the four or six or eight hour immersions, the files should be washed and dried quickly and then they may be dipped in sperm or sweet oil so as to prevent further action of the acid solution. By this method and composition the files may be reclaimed three or four times.

If desired, the granulated ammonium sulfate may be omitted from the solution and the dilute sulfuric acid alone used after the files have been boiled in the saleratus solution the required length of time.

I claim:

1. A process of reclaiming gummer and linter files, which consists in boiling the files in a solution of saleratus and then immersing the files in dilute sulfuric acid.

2. A process of reclaiming gummer and linter files, which consists in boiling the files in a solution of saleratus and then immersing the files in dilute sulfuric acid and covering the files with oil.

3. A process for reclaiming gummer and linter files, which consists in boiling the files in a solution of saleratus and then immersing the files in a solution formed of diluted sulfuric acid and granulated ammonium sulfate.

4. A process for reclaiming gummer and linter files, which consists in boiling the files in a solution of saleratus and then immersing the files in a solution formed of dilute sulfuric acid and granulated ammonium sulfate and covering the files with oil.

5. A process for reclaiming gummer and linter files, which consists in boiling the files in a solution of about four ounces of saleratus to about one quart of water and immersing the files in a solution formed of about one-tenth of an ounce of granulated ammonium sulfate in about one quart of water which has been acidified with about four ounces of sulfuric acid.

6. A process for reclaiming gummer and linter files, which consists in boiling the files in a solution of saleratus for about one-half an hour and immersing the files in a solution of granulated ammonium sulfate and water acidified by sulfuric acid for about four hours.

7. A process for reclaiming gummer and linter files, which consists in boiling the files in a solution of saleratus for about one-half an hour and immersing the files in a solution of granulated ammonium sulfate and water acidified by sulfuric acid for about four hours for the first reclaiming and two additional hours for each subsequent reclaiming and increasing the strength of the acid solution ten per cent. for each subsequent reclaiming.

In testimony whereof I have hereunto signed my name to this specification.

LANDON J. LOCKETT.